United States Patent [19]

Hardy, Jr. et al.

[11] Patent Number: 4,944,523
[45] Date of Patent: Jul. 31, 1990

[54] END LINK FOR STABILIZER BAR

[75] Inventors: Donald P. Hardy, Jr.; Eric C. Parker, both of Algonquin, Ill.

[73] Assignee: Illinois Tool Works, Chicago, Ill.

[21] Appl. No.: 318,298

[22] Filed: Mar. 3, 1989

[51] Int. Cl.[5] .............................................. B60G 11/50
[52] U.S. Cl. .................................... 280/689; 411/546; 411/544; 411/915
[58] Field of Search .................... 280/689, 723, 716; 411/546, 544, 542, 915; 403/228, 377, 365, 225, 226; 267/260, 276, 148, 149

[56] References Cited

U.S. PATENT DOCUMENTS

| | | | |
|---|---|---|---|
| 3,212,387 | 10/1965 | Madansky | 411/546 |
| 4,113,278 | 9/1978 | Rissberger | 280/689 |
| 4,369,988 | 1/1983 | Takagi | 280/689 |

Primary Examiner—Charles A. Marmor
Assistant Examiner—Karin Tyson
Attorney, Agent, or Firm—Neal C. Johnson; Thomas W. Buckman

[57] ABSTRACT

An end link for a stabilizer bar, a suspension system for an automobile, or for a motor truck, and a method for assembling the end link. A unitary spool has a tubular body and an annular flange at each end. Two annular washers conform in thickness and outer diameter to the flanges. Four annular grommets made of an elastomeric material conform in shape to each other, each having one end adapted to be snap-fitted over one of the flanges or over one of the washers. A bolt, which has a head and a shank with a threaded end, and a nut, which threads onto the threaded end, are used to assemble the end link from a pre-assembled grommet-spool-grommet subassembly, in which a respective one of the grommets is snap-fitted at its snap-fittable end over each of the flanges of the spool, and two pre-assembled grommet-washer subassemblies, in each of which a respective one of the grommets is snap-fitted at its snap-fittable end over a respective one of the washers. Preferably, the bolt and one of the washers are integrated into a unitary part. As it is assembled, the end link can be easily connected to a stabilizer bar, which is formed with an aperture near one end, and to a control element, which also is formed with an aperture. The opposite ends of two adjacent grommets, namely a grommet from the grommet-spool-grommet subassembly and a grommet from one of the grommet-washer subassemblies, form tubular extensions, which extend axially, from opposite directions, into each aperture.

22 Claims, 1 Drawing Sheet

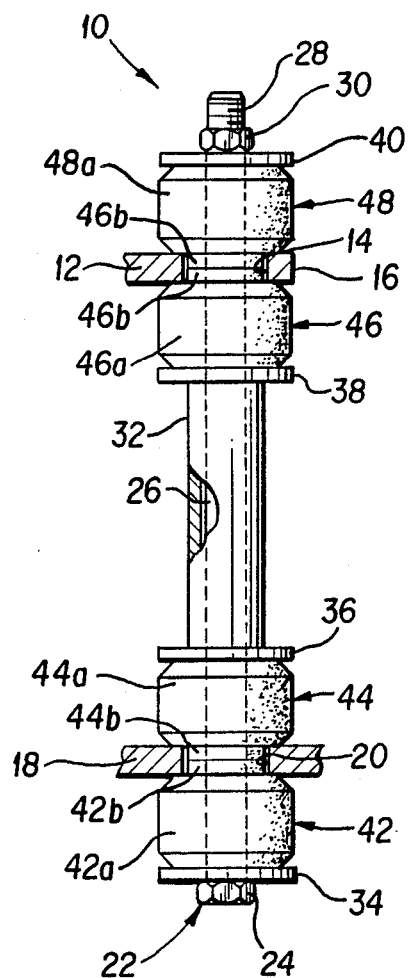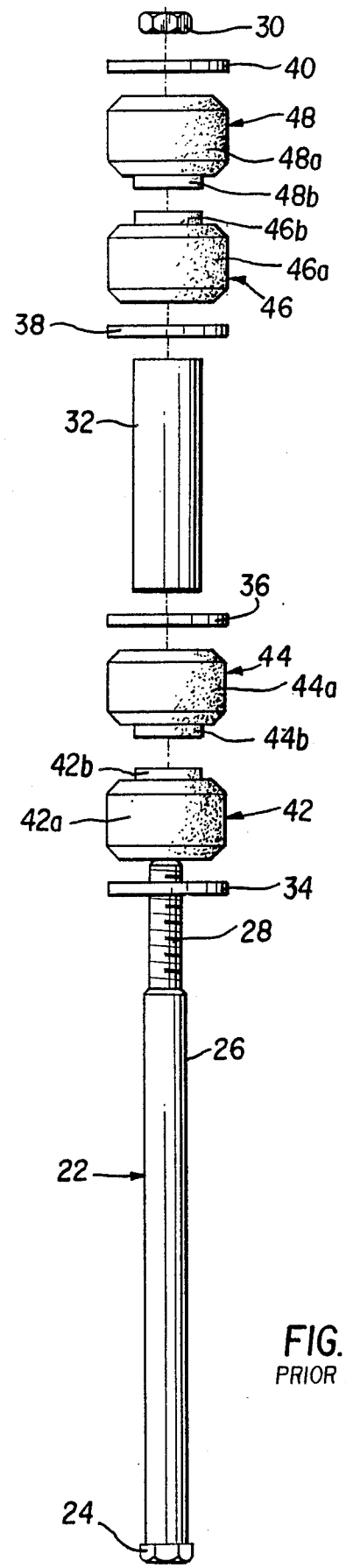
FIG. 1 PRIOR ART
FIG. 2 PRIOR ART

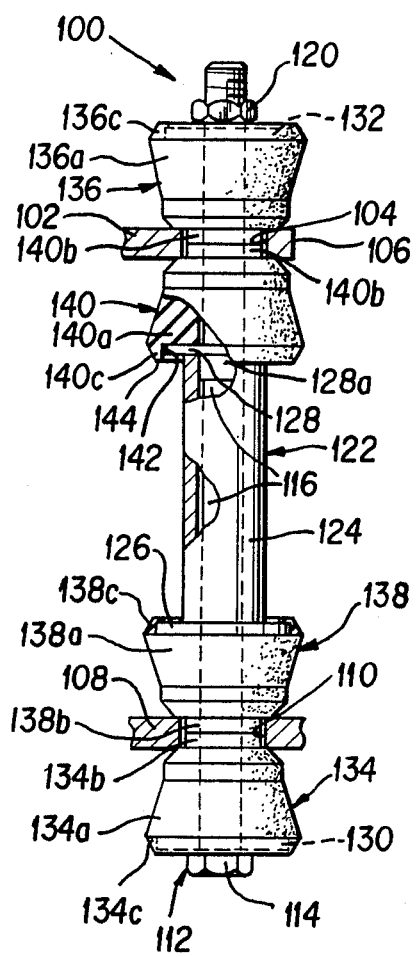
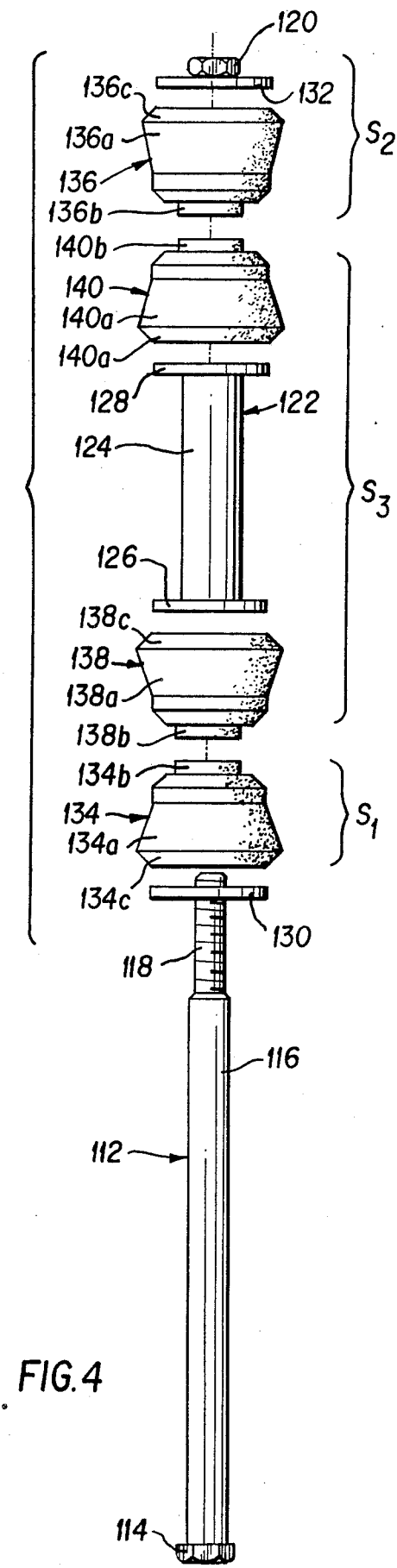
FIG. 3
FIG. 4

END LINK FOR STABILIZER BAR

TECHNICAL FIELD OF THE INVENTION

This invention pertains to an end link for a stabilizer bar for a suspension system for a motor vehicle, such as an automobile or a light truck, and to a method for assembling such a link. This invention pertains also to a suspension system comprising such a link, a stabilizer bar, and a control element, such as a control arm or an axle housing bracket, and to a method for connecting such a link to a stabilizer bar and to a control element.

BACKGROUND OF THE INVENTION

It has been known for a motor vehicle, such as an automobile or a light truck, to employ, at each front wheel or at each rear wheel, a suspension system comprising an upper stabilizer bar, a lower control element, such as a control arm or an axle housing bracket, and an end link, which links one end of the upper stabilizer bar to the lower control element, so as to transmit vertical forces between the control element and the stabilizer bar.

Such a system comprising an upper stabilizer bar, a lower control arm, and an end link has been employed, at each front wheel, on certain CAMERO TM and FIREBIRD TM automobiles sold by General Motors Corporation, Chevrolet Motor Division, Detroit, Mich. Vittone U.S. Pat. No. 3,315,952 discloses such a system comprising an upper stabilizer bar, an axle housing bracket, and an end link, at each rear wheel of an automobile. In Takadera et al. U.S. Pat. No. 4,621,831 and Saotome et al. U.S. Pat. No. 4,664,408, more complex systems comprising end links, or similar devices, are disclosed.

Typically, as known heretofore, the end link comprises eleven elements, namely a bolt having a head and having a shank with a threaded end, a nut therefor, a tubular sleeve, four annular washers, and four annular grommets. Each grommet has a larger end and a smaller end, which forms a tubular extension of the grommet, and is made of an elastomeric material, such as a natural or synthetic rubber.

Such a link is assembled by extending the bolt shank successively through a first washer, a first grommet and a second grommet, a second washer, the sleeve, a third washer, a third grommet and a fourth grommet, and a fourth washer, and threading the nut onto the threaded end of the bolt shank. The respective grommets must be axially oriented such that the tubular extensions of the first and second grommets face each other and such that the tubular extensions of the third and fourth grommets face each other.

Such a link is connected to a stabilizer bar, which is formed with an aperture of a suitable diameter near one end, and to a control element, which also is formed with such an aperture, as the end link is assembled, by causing the tubular extensions of the first and second grommets to extend axially, from opposite directions, into one such aperture, as the bolt shank is extended through the first and second grommets, and causing the tubular extensions of the third and fourth grommets to extend axially, from opposite directions, into the other aperture, as the bolt shank is extended through the third and fourth grommets.

Assembly of such a link and connection of such a link to a stabilizer bar and to a control element, as described above, are complicated tasks, which require a worker to handle eleven parts of the end link, and which are susceptible to some mistakes due to omission of parts, particularly washers, or to inversion of grommets in an axial sense. Such mistakes can be very expensive to rectify, particularly in a motor vehicle assembly plant.

There has been a need heretofore to improve such a link and methods for assembling such a link and for connecting such a link to a stabilizer bar and to a control element, such as a control arm or an axial housing bracket, so as to facilitate proper assembly and proper connection.

SUMMARY OF THE INVENTION

This invention provides an end link for a stabilizer bar for a suspension system for a motor vehicle, such as an automobile or a light truck. The end link comprises several subassemblies, which facilitate proper assembly of the end link to a stabilizer bar and to a control element, such as a control arm or an axle housing bracket.

Thus, a grommet-spool-grommet subassembly comprises a unitary spool, which has a tubular body and an annular flange at each end of the tubular body, the annular flanges conforming in thickness and outer diameter to each other, and two annular grommets, which conform in shape to each other and are made of an elastomeric material, such as a natural or synthetic rubber. Each of the grommets of the grommet-spool-grommet subassembly has a snap-fittable end, which is adapted to be snap-fitted and is snap-fitted over a respective one of the flanges, and an opposite end.

Also, each of two grommet-spool subassemblies, namely a first grommet-spool subassembly and a second grommet-spool subassembly, comprises an annular washer, which conforms in outer diameter to each of the flanges of the unitary spool, and an annular grommet, which conforms in shape to each of the grommets of the grommet-spool-grommet subassembly and is made of a similar material. Each of the grommets of the grommet-spool assemblies also has a snap-fittable end, which is adapted to be snap-fitted and is snap-fitted over a respective one of the annular washers, and an opposite end.

Moreover, the end link comprises a bolt, which has a head and a shank with a threaded end, and a nut, which is adapted to be threaded onto the threaded end of the shank. Preferably, the nut and the washer of the second grommet-washer subassembly are integrated, as by welding or brazing, into a unitary part.

In assembly of the end link, the shank of the bolt is extended successively through the first grommet-washer subassembly, such that the washer of the first grommet-washer subassembly faces toward the head of the bolt, through the grommet-spool-grommet subassembly, and through the second grommet-washer subassembly, such that the washer of the second grommet-washer subassembly faces away from the head of the bolt, whereupon the nut is threaded onto the threaded end of the bolt shank. The end link may be so assembled when it is desired to connect the end link to a stabilizer bar and to a control element, as described below, or by itself for storage or shipment.

So as to adapt the end link for connection to a stabilizer bar and to a control element, in a suspension system for a motor vehicle, such as an automobile or a light truck, the opposite ends of the grommets form tubular extensions, which are smaller in outer diameter than the snap-fittable ends of the grommets. Moreover, the stabilizer bar is formed with a circular aperture near one end, and the control element also is formed with a circular aperture. Each of the apertures is smaller in diameter than the outer diameter of the grommets, except at the tubular extensions, which are adapted to fit axially into the apertures.

In connection of the end link to the stabilizer bar and to the control element, the tubular extension of the grommet at a given end of the grommet-spool-grommet subassembly (such as its upper end) and the tubular extension of the grommet of the grommet-washer subassembly adjacent to the grommet at the given end of the grommet-spool-grommet subassembly are disposed so as to extend axially, from opposite directions, into the aperture formed in the stabilizer bar, as the bolt shank is extended through the grommets having tubular extensions extending into the aperture formed in the stabilizer bar. Moreover, the tubular extensions of the other grommets are disposed so as to extend axially, from opposite directions, into the aperture formed in the control element, as the bolt shank is extended through the grommets having tubular extensions extending into the aperture formed in the control element.

Because of the several subassemblies noted above are pre-assembled, assembly of the end link and connection of the end link to the stabilizer bar and the control element are facilitated. Moreover, mistakes due to omission of parts, particularly washers, or to inversion of grommets in an axial sense are virtually eliminated.

These and other objects, features, and advantages of this invention will be evident from the following description of a preferred embodiment of this invention with reference to the accompanying drawing.

BRIEF DESCRIPTION OF THE DRAWING

FIG. 1 is an elevational view of an end link exemplifying prior art, as combined with a stabilizer bar and a control element, which are shown fragmentarily in cross-section. Portions of the end link are shown in FIG. 1 as broken away to reveal certain details.

FIG. 2 is an exploded view of the end link of FIG. 1. The stabilizer bar and the control element are not shown in FIG. 2.

FIG. 3 is an elevational view of an end link constituting a preferred embodiment of this invention, as combined with a stabilizer bar and a control element, which are shown fragmentarily in cross-section. Portions of the end link are shown in FIG. 3 as broken away to reveal certain details.

FIG. 4 is an exploded view of the end link of FIG. 3. The stabilizer bar and the control element are not shown in FIG. 4.

DETAILED DESCRIPTION OF PREFERRED EMBODIMENT

Before a detailed description of an end link constituting a preferred embodiment of this invention is given, an end link 10 exemplifying prior art will be first described, as shown in FIGS. 1 and 2.

The end link 10 is shown in FIG. 1 as connected to a stabilizer bar 12, which has a circular aperture 14 near one end 16 of the stabilizer bar 12, and to a control element 18, such as a control arm or an axle housing bracket, which also is formed with a circular aperture 20, in a suspension system for a motor vehicle, such as an automobile or a light truck. Typically, as shown, the thickness of the stabilizer bar 12 at the margin of the aperture 14 and the thickness of the control element 18 at the margin of the aperture 20 are approximately equal.

The end link 10 comprises a steel bolt 22, which has a head 24 and a shank 26 with a threaded end 28, a steel nut 30 therefor, a tubular steel sleeve 32, first, second, third, and fourth annular steel washers 34, 36, 38, and 40 respectively, and first, second, third and fourth annular grommets 42, 44, 46 and 48 respectively.

Each of the grommets of the end link 10 is molded of an elastomeric material, such as a natural or synthetic rubber. Each conforms in shape to the other grommets of the end link 10 and has an annular body, which is chambered at each end. Moreover, each has a larger end and a smaller end, which forms a tubular extension of the annular body of the grommet. Thus, the grommets 42, 44, 46, and 48 respectively have annular bodies 42*a*, 44*a*, 46*a*, and 48*a* respectively with tubular extensions 42*b*, 44*b*, 46*b*, and 48*b* respectively.

The end link 10 is assembled by extending the bolt shank 26 successively through the first washer 34, the first grommet 42 and the second grommet 44, the second washer 36, the sleeve 32, the third washer 38, the third grommet 46 and the fourth grommet 48, and the fourth washer 40, and threading the nut 30 onto the threaded end 28 of the bolt shank 26. The grommet 42, 44, 46, and 48 must be axially oriented such that the tubular extensions 42*b* and 44*b* face each other and such that the tubular extensions 46*b* and 48*b* face each other.

Each of the apertures 14 and 20, as formed in the stabilizer bar 12 and the control element 18 respectively, has a diameter smaller than the outer diameter of the grommets 42, 44, 46, and 48, except at the tubular extensions 42*b*, 44*b*, 46*b* and 48*b*, which are adapted to fit axially into the apertures 14 and 20. Each of the tubular extensions 42*b*, 44*b*, 46*b*, and 48*b* has an axial length not greater than one-half of the thickness of the stabilizer bar 12 at the margin of the aperture 14 and not greater than one-half of the thickness of the control element 18 at the margin of the aperture 20.

The end link 10 is connected to the stabilizer bar 12 and to the control element 18, as the end link 10 is assembled, by causing the tubular extension 42*b* of the first grommet 42 and the tubular extension 44*b* of the second grommet 44 to extend axially, from opposite directions, into the aperture 20 formed in the control element 18, as the bolt shank 26 is extended through the first grommet 42 and the second grommet 44, and causing the tubular extension 46*b* of the third grommet 46 and the tubular extension 48*b* of the fourth grommet 48 to extend axially, from opposite directions, into the aperture 14 formed in the stabilizer bar 12, as the bolt shank 26 is extended through the third grommet 46 and the fourth grommet 48.

Assembly of the end link 10 and connection of the end link 10 to the stabilizer bar 12 and to the control element 18, as described above, are complicated tasks, which require a worker to handle eleven loose parts of the end link 10, and which are susceptible to some mistakes due to omission of parts, particularly washers, or to inversion of grommets in an axial sense.

As shown in FIGS. 3 and 4, an end link 100 constituting a preferred embodiment of this invention comprises several subassemblies, which are pre-assembled, so as to facilitate assembly of the end link 100 and connection of the end link 100 to a stabilizer bar 102, which is like the stabilizer bar 12 and has a circular aperture 104 near one end 106 of the stabilizer bar 102, and to a control element 108, which is like the control element 18 and also is formed with a circular aperture 110. The stabilizer bar 102 and the control element 108 are used in a suspension system for a motor vehicle, such as an automobile or a light truck. Desirably, as shown, the thickness of the stabilizer bar 102 at the margin of the aperture 104 and the thickness of the control element 108 at the margin of the aperture 110 are approximately equal.

The end link 100 comprises a steel bolt 112, which has a head 114 and a shank 116 with a threaded end 118, a steel nut 120 therefor, a unitary spool 122, which has a steel tubular body 124 with an annular steel flange 126 at its lower end and an annular steel flange 128 at its upper end, a first annular steel washer 130 and a second annular steel washer 132, and first, second, third, and fourth annular grommets 134, 136, 138, and 140 respectively. In FIGS. 3 and 4, the annular grommets 134 and 136 are the lowermost and uppermost grommets respectively, and the annular grommets 138 and 140 are therebetween with the annular grommet 138 below the annular grommet 140. The tubular body 124 may be suitably formed from a flat piece of steel stock with an axial seam (not shown) and with the annular flanges 126 and 128, which have tubular extensions (see, e.g., the tubular extension 128a of the annular flange 128, as shown in FIG. 3) extending into the tubular body 124, being welded or brazed to its opposite ends. The unitary spool 122 may be alternately molded, in one piece, from a suitable polymer material. Each of the annular flanges 126 and 128 at the opposite ends of the tubular body 124 of the unitary spool 122 and each of the annular washers 130 and 132 conform in outer diameter to each other. Preferably, as shown, the nut 120 and the second annular washer 132 are integrated, as by welding or brazing, into a unitary part.

Each of the annular grommets 134, 136, 138, and 140 conforms in shape to the other grommets of the end link 100 and is molded of an elastomeric material, such as a natural or synthetic rubber. Each has an annular body, which is chambered at each end. Each has a larger end and a smaller end, which forms a tubular extension of the annular body of the grommet. The annular body of each has a substantially frusto-conical shape, as shown, except for its chambered ends, and except for a portion having a cylindrical outer wall near its smaller end, which forms the tubular extension. The larger end of each is formed with a circular cavity (see, e.g., the circular cavity 142 formed in the larger end of the annular grommet 140, as shown in FIG. 3) with an annular lip (see, e.g., the annular lip 144 of the circular cavity 142, as shown in FIG. 3) of a diameter that is slightly less than the outer diameter of the annular flanges 126 and 128 and the annular washers 130 and 132. The larger end of each is adapted (because of the circular cavity with the annular lip and because of the elastomeric material) to be snap-fitted over either of the annular flanges 126 and 128 of the unitary spool 122 or over either of the annular washers 130 and 132. Thus, the annular grommets 134, 136, 138, and 140 respectively have annular bodies 134a, 136a, 138a, and 140a respectively with tubular extensions 134b, 136b, 138b, and 140b respectively and with snap-fittable ends 134c, 136c, 138c, and 140c respectively.

Preliminarily, the snap-fittable end 134c of the first annular grommet 134 is snap-fitted over the first annular washer 130, so as to provide a first grommet-washer subassembly $S_1$. Moreover, the snap-fittable end 136c of the second annular grommet 136 is snap-fitted over the second annular washer 132, which preferably is integrated with the nut 120 in a manner discussed above, so as to provide a second grommet-washer subassembly $S_2$. Furthermore, the snap-fittable end 138c of the third annular grommet 138 is snap-fitted over the annular flange 126 at the lower end of the unitary spool 122 and the snap-fittable end 140c of the fourth annular grommet 140 is snap-fitted over the annular flange 128 at the upper end of the unitary spool 122, so as to provide a grommet-spool-grommet subassembly $S_3$. The first and second grommet-washer subassemblies $S_1$ and $S_2$ and the grommet-spool-grommet subassembly $S_3$, all three of which are pre-assembled, facilitate assembly of the end link 100 and connection of the end link 100 to the stabilizer bar 102 and to the control element 108.

In assembly of the end link 100, the bolt shank 116 is extended successively through the first grommet-washer subassembly $S_1$, such that the first annular washer 130 faces toward the bolt head 114, through the grommet-spool-grommet subassembly $S_3$, such that the tubular extension 138b of the third annular grommet 138 faces the tubular extension 136b of the first annular grommet 136, and through the second grommet-washer subassembly $S_2$, such that the second annular washer 132 faces away from the bolt head 114, and such that the tubular extension 140b of the fourth annular grommet 140 faces the tubular extension 136b of the second annular grommet 136, whereupon the nut 120 is threaded onto the threaded end 118 of the bolt shank 120. If the second annular washer 132 and the nut 120 are integrated into a unitary part, it is convenient to hold the nut 120 and to turn the bolt 112, via the bolt head 114. Because the grommet-spool-grommet subassembly $S_3$ has end-to-end symmetry, it does not matter if the grommet-spool-grommet subassembly $S_3$ is inverted in an axial sense, such that the tubular extension 140b of the fourth annular grommet 140, rather than the tubular extension 138b of the third annular grommet 138, faces the tubular extension 134b of the first annular grommet 134.

Each of the apertures 104 and 110, as formed in the stabilizer bar 102 and the control element 108 respectively, has a diameter smaller than the outer diameter of the grommets 134, 136, 138, and 140, except at the tubular extensions 132b, 134b, 136b, and 140b, which are adapted to fit into the apertures 104 and 110. Each of the tubular extensions 134b, 136b, 138b, and 140b has an axial length not greater than one-half of the thickness of the stabilizer bar 102 at the margin of the aperture 104 and not greater than one-half of the thickness of the control element 108 at the margin of the aperture 110.

In connection of the end link 100 to the stabilizer bar 102 and to the control element 108, the tubular extension 138b of the third annular grommet 138, which is located at the lower end of the grommet-spool-grommet subassembly $S_3$, and the tubular extension 134b of the first annular grommet 134 of the first grommet-washer subassembly $S_1$, which is below the grommet-spool-grommet subassembly $S_3$, are disposed so as to extend axially, from opposite directions, into the aperture 110 formed in the control element 108, as the bolt shank 116 is extended through the annular grommets 138 and 134 having the tubular extensions 138b and 134b extending into the aperture 110. Moreover, the tubular extension 140b of the fourth annular grommet 140, which is located at the upper end of the grommet-spool-grommet subassembly $S_3$, and the tubular extension 136b of the second annular grommet 136 of the second grommet-washer subassembly $S_2$, which is above the grommet-spool-grommet subassembly S₃, are disposed so as to extend axially, from opposite directions, into the aperture 104 formed in the stabilizer bar 102, as the bolt shank 116 is extended through the annular grommets 140 and 136 having the tubular extensions 140b and 136b extending into the aperture 104.

In connection of the end link 100 to the stabilizer bar 102 and to the control element 108, a worker is required to handle far fewer parts, as contrasted with the eleven parts of the end link 10, and those parts of the end link 100 (namely the pre-assembled subassemblies S₁, S₂, and S₃, along with the bolt 112 and the nut 120, which preferably is integrated with the second washer 132 in the second grommet-washer subassembly S₂) cannot be easily mis-assembled or mis-connected to the stabilizer bar 102 and to the control element 108.

Except for the bolt 112 and the nut 120, the end link 100, as assembled, has end-to-end symmetry. Therefore, it does not matter if the end link 100 is inverted in an axial sense, when assembled and connected to the stabilizer bar 102 and to the control element 108, such that the tubular extensions 136b and 140b extend into the aperture 110 formed in the control element 108, such that the tubular extensions 134b and 138b extend into the aperture 104 formed in the stabilizing bar 102, and such that the nut 120 is near the lower end of the end link 100, rather than near its upper end.

Herein, such terms as "upper", "lower", "above", and "below" are intended to refer to a convenient orientation of the end link 100, as shown, but are not intended to limit the end link 100 to any specific orientation.

Other changes may be also made in the end link 100 without departing from the scope and spirit of this invention.

We claim:

1. An end link for a stabilizer bar for a suspension system for a motor vehicle, such as an automobile or a light truck, the end link comprising:
   (a) a unitary spool having a tubular body and having an annular flange at each end of the tubular body, said flanges conforming in thickness and outer diameter to each other;
   (b) two annular washers, each conforming in outer diameter to each of said flanges;
   (c) four annular grommets conforming in shape to each other and being made of an elastomeric material, each having a snap-fittable end adapted to be snap-fitted over either of said flanges or over either of said washers, and each having an opposite end;
   (d) a bolt having a head and a shank with a threaded end; and
   (e) a nut adapted to be threaded onto the threaded end of the shank of the bolt;
wherein the snap-fittable end of a respective one of said grommets is snap-fitted over each of said flanges, so as to form a grommet-spool-grommet subassembly; wherein the snap-fittable end of a respective one of said grommets is snap-fitted over each of said washers, so as to form a first grommet-washer subassembly and a second grommet-washer subassembly; wherein the shank of the bolt extends successively through the first grommet-washer subassembly, such that the washer of the first grommet-washer subassembly faces toward the head of the bolt, through the grommet-spool-washer subassembly, and through the second grommet-washer subassembly, such that the washer of the second grommet-washer subassembly faces away from the head of the bolt; and wherein the nut is threaded onto the threaded end of the shank of the bolt.

2. The end link of claim 1 wherein the nut and the washer of the second grommet-washer subassembly are integrated into a unitary part.

3. The end link of claim 1 wherein the opposite ends of the grommets form tubular extensions, which are smaller in outer diameter than the snap-fittable ends of the grommets.

4. The end link of claim 3 wherein the nut and the washer of the second grommet-washer subassembly are integrated into a unitary part.

5. An end link for a stabilizer bar for a suspension system for a motor vehicle, such as an automobile or a light truck, the end link comprising:
   (a) a pre-assembled grommet-spool-grommet subassembly comprising:
      (1) a unitary spool having a tubular body and having an annular flange at each end of the tubular body, said flanges conforming in thickness and outer diameter to each other; and
      (2) two annular grommets conforming in shape to each other and being made of an elastomeric material, each having a snap-fittable end adapted to be snap-fitted and snap-fitted over a respective one of said flanges, and each having an opposite end;
   (b) a first grommet-washer subassembly and a second grommet-washer subassembly, each being pre-assembled and comprising:
      (1) an annular washer conforming in outer diameter to each of said flanges; and
      (2) a grommet conforming in shape to each of the grommets of the grommet-spool-grommet subassembly and being made of an elastomeric material, each having a snap-fittable end adapted to be snap-fitted and snap-fitted over a respective one of said washers, and each having an opposite end;
   (c) a bolt having a head and having a shank with a threaded end; and
   (d) a nut adapted to be threaded onto the threaded end of the shank of the bolt;
wherein the shank of the bolt extends successively through the first grommet-washer subassembly, such that the washer of the first grommet-washer subassembly faces toward the head of the bolt, through the grommet-spool-washer subassembly; and through the second grommet-washer subassembly, such that the washer of the second grommet-washer subassembly faces away from the head of the bolt; and wherein the nut is threaded onto the threaded end of the shank of the bolt.

6. The end link of claim 5 wherein the nut and the washer of the second grommet-washer subassembly are integrated into a unitary part.

7. The end link of claim 5 wherein the opposite ends of the grommets form tubular extensions, which are smaller in outer diameter than the snap-fittable ends of the grommets.

8. The end link of claim 7 wherein the nut and the washer of the second grommet-washer subassembly are integrated into a unitary part.

9. A method for assembling an end link for a stablizing bar for a suspension system for a motor vehicle, such as an automobile or a light truck, the method comprising:
   (a) providing:

(1) a unitary spool having a tubular body and having an annular flange at each end of the tubular body, said flanges conforming in thickness and outer diameter to each other;

(2) two annular washers, each conforming in outer diameter to each of said flanges;

(3) four annular grommets conforming in shape to each other and being made of an elastomeric material, each having a snap-fittable end adapted to be snap-fitted over either of said flanges or over either of said washers, and each having an opposite end;

(4) a bolt having a head and having a shank with a threaded end; and (5) a nut adapted to be threaded onto the threaded end of the shank of the bolt;

(b) snap-fitting the snap-fittable end of a respective one of said grommets over each of said flanges, so as to form a grommet-spool-grommet subassembly;

(c) snap-fitting the snap-fittable end of a respective one of said grommets over each of said washers, so as to form a first grommet-washer subassembly and a second grommet-washer subassembly; and then (d) extending the shank of the bolt successively through:
(1) the first grommet-washer subassembly, such that the washer of the first grommet-washer subassembly faces toward the head of the bolt;
(2) the grommet-spool-grommet subassembly; and
(3) the second grommet-washer subassembly, such that the washer of the second grommet-washer subassembly faces away from the head of the bolt; and (e) threading the nut onto the threaded end of the shank of the bolt.

10. The method of claim 9 wherein the nut and the washer of the second grommet-washer subassembly, as provided, are integrated into a unitary part.

11. The method of claim 9 wherein the opposite ends of the grommets form tubular extensions, which are smaller in outer diameter than the snap-fittable ends of the grommets.

12. The method of claim 11 wherein the nut and the washer of the second grommet-washer subassembly, as provided, are integrated into a unitary part.

13. A method for assembling an end link for a stabilizer bar for a suspension system for a motor vehicle, such as an automobile or a light truck, the method comprising:

(a) providing a pre-assembled grommet-spool-grommet subassembly comprising:
(1) a unitary spool having a tubular body and having an annular flange at each end of the tubular body, said flanges conforming in thickness and outer diameter to each other; and
(2) two annular grommets conforming in shape to each other and being made of an elastomeric material, each having a snap-fittable end adapted to be snap-fitted and snap-fitted over a respective one of said flanges, and each having an opposite end;

(b) providing a first grommet-washer subassembly and a second grommet-washer subassembly, each being pre-assembled and comprising:
(1) an annular washer conforming in outer diameter to each of said flanges; and
(2) a grommet conforming in shape to each of the grommets of the grommet-spool-grommet subassembly and being made of an elastomeric material, each having a snap-fittable end adapted to be snap-fitted and snap-fitted over a respective one of said washers, and each having an opposite end;

(c) providing a bolt, which has a head and a shank with a threaded end, and extending the shank of the bolt successively through:
(1) the first grommet-washer subassembly, such that the washer of the first grommet-washer subassembly faces toward the head of the bolt;
(2) the grommet-spool-grommet subassembly; and
(3) the second grommet-washer subassembly, such that the washer of the second grommet-washer subassembly faces away from the head of the bolt; and (d) providing a nut, which is adapted to be threaded onto the threaded end of the shank of the bolt, and threading the nut onto the threaded end of the shank of the bolt.

14. The method of claim 13 wherein the nut and the washer of the second grommet-washer subassembly, as provided, are integrated into a unitary part.

15. The method of claim 13 wherein the opposite ends of the grommets form tubular extensions, which are smaller in outer diameter than the snap-fittable ends of the grommets.

16. The method of claim 15 wherein the nut and the washer of the second grommet-washer subassembly, as provided, are integrated into a unitary part.

17. A suspension system for a motor vehicle, such as an automobile or a light truck, the suspension system comprising:

(a) the end link of claim 1 wherein the opposite ends of the grommets form tubular extensions, which are smaller in outer diameter than the snap-fittable ends of the grommets;

(b) a stabilizer bar formed with a circular aperture near one end of the stabilizer bar; and (c) a control element formed with a circular aperture; wherein each of the apertures is smaller in diameter than the outer diameter of the grommets, except at the tubular extensions, which are adapted to fit axially into the apertures; and wherein the stabilizer bar and the control element are connected by the end link, in which the tubular extension of the grommet at a given end of the grommet-spool-grommet subassembly and the tubular extension of the grommet of the grommet-washer subassembly adjacent to the grommet at the given end of the grommet-spool-grommet subassembly extend axially, from opposite directions, into the aperture formed in the stabilizer bar, and in which the tubular extensions of the other grommets extend axially, from opposite directions, into the aperture formed in the control element.

18. The suspension system of claim 17 wherein the nut and the washer of the second grommet-washer subassembly are integrated into a unitary part.

19. The method of claim 9 wherein the opposite ends of the grommets form tubular extensions, which are smaller in outer diameter than the snap-fittable ends of the grommets; wherein a stabilizer bar and a control element are provided for a suspension system for a motor vehicle, such as an automobile or a light truck; wherein the stabilizer bar is formed with a circular aperture near one end of the stabilizer bar and the control element is formed with a circular aperture; wherein each of the apertures is smaller in diameter than the outer diameter of the grommets, except at the tubular extensions, which are adapted to fit into the apertures; and wherein the end link is connected to the stabilizer bar and to the control element, as the end link is assembled, by:

(a) disposing the tubular extension of the grommet at a given end of the grommet-spool-grommet subassembly and the tubular extension of the grommet of the grommet-washer subassembly adjacent to the grommet at the given end of the grommet-spool-washer subassembly so as to extend axially, from opposite directions, into the aperture formed in the stabilizer bar, as the shank of the bolt is extended through the opposite ends extending into the aperture formed in the stablizer bar; and (b) disposing the tubular extensions of the other grommets so as to extend axially, from opposite directions, into the aperture formed in the control element, as the shank of the bolt is extended through the opposite ends extending into the aperture formed in the control element.

20. The method of claim 19 wherein the nut and the washer of the second grommet-washer subassembly, as provided, are integrated into a unitary part.

21. The method of claim 13 wherein the opposite ends of the grommets form tubular extensions, which are smaller in outer diameter than the snap-fittable ends of the grommets; wherein a stabilizer bar and a control element are provided for a suspension system for a motor vehicle, such as an automobile or a light truck; wherein the stabilizer bar is formed with a circular aperture near one end of the stabilizer bar and the control element is formed with a circular aperture; wherein each of the apertures is smaller in diameter than the outside diameter of the grommets, except at the tubular extensions, which are adapted to fit into the apertures; and wherein the end link is connected to the stabilizer bar and to the control element, as the end link is assembled, by:

(a) disposing the tubular extension of the grommet at a given end of the grommet-spool-grommet subassembly and the tubular extension of the grommet of the grommet-washer subassembly adjacent to the grommet at the given of the grommet-spool-grommet subassembly so as to extend axially, from opposite directions, into the aperture formed in the stabilizer bar, as the shank of the bolt is extended through the tubular extensions extending into the aperture formed in the stabilizer bar; and (b) disposing the tubular extensions of the other grommets so as to extend axially, from opposite directions, into the aperture formed in the control element, as the shank of the bolt is extended through the opposite ends extending into the aperture formed in the control element.

22. The method of claim 21 wherein the nut and the washer of the second grommet-washer subassembly, as provided, are integrated into a unitary part.

* * * * *

UNITED STATES PATENT AND TRADEMARK OFFICE
CERTIFICATE OF CORRECTION

PATENT NO. : 4,944,523

DATED : July 31, 1990

INVENTOR(S) : Donald P. Hardy, Jr. And Eric C. Parker

It is certified that error appears in the above-identified patent and that said Letters Patent is hereby corrected as shown below:

Column 7, Line 64: "grommet-spool-washer" should be -grommet-spool-grommet-

Column 8, Lines 47-48: "grommet-spool-washer" should be -grommet-spool-grommet-

Signed and Sealed this

Second Day of November, 1993

Attest:

BRUCE LEHMAN

Attesting Officer

Commissioner of Patents and Trademarks